United States Patent [19]
Mizuno et al.

[11] 4,254,672
[45] Mar. 10, 1981

[54] CONTROL SYSTEM FOR A STEPLESS VARIABLE SPEED TRANSMISSION

[75] Inventors: Kiyofumi Mizuno; Masanori Sato, both of Nagoya; Hiroaki Maeda, Toyota; Shigeo Takahashi, Kariya; Satomi Suzuki, Nagoya, all of Japan

[73] Assignee: Aisin Seiki Kabushiki Kaisha, Kariya, Japan

[21] Appl. No.: 23,993

[22] Filed: Mar. 26, 1979

[30] Foreign Application Priority Data

Mar. 27, 1978 [JP] Japan .................... 53-35767

[51] Int. Cl.³ .................... B60K 41/04; B60K 41/12
[52] U.S. Cl. .................... 74/869; 74/687; 74/720
[58] Field of Search .................... 74/868, 869, 720, 687, 74/865

[56] References Cited

U.S. PATENT DOCUMENTS

| | | | |
|---|---|---|---|
| 3,442,153 | 5/1969 | Ross | 74/868 X |
| 4,033,203 | 7/1977 | Hirosawa et al. | 74/869 |
| 4,043,227 | 8/1977 | Beals et al. | 74/868 |
| 4,091,690 | 5/1978 | Miyao | 74/868 X |
| 4,170,153 | 10/1979 | Mizano et al. | 74/868 |

*Primary Examiner*—H. Hampton Hunter
*Attorney, Agent, or Firm*—Sughrue, Rothwell, Mion, Zinn & Macpeak

[57] ABSTRACT

A control system for a stepless variable speed transmission of power splitting type for use in a vehicle in which the power from an engine is transmitted with a controllable speed and wherein part of the power is converted into hydraulic power by means of hydraulic pump motor. The system comprises an up shift valve which switches a hydraulic pressure of a clutch and brake in the transmission to change the transmission to a high speed ratio range when a speed ratio increasing hydraulic pressure in a speed ratio control actuator exceeds a given value, a down shift valve which switches the hydraulic pressure of the clutch and brake to change the transmission to a low speed ratio range when a speed ratio decreasing hydraulic pressure exceeds a given value and a directional control valve which reverse the direction of the speed ratio increasing and the speed ratio decreasing hydraulic pressure to the actuator in accordance with a pressure difference between the hydraulic pressure of the clutch and brake in the low speed ratio range and the hydraulic pressure of the clutch and brake in the high speed range.

6 Claims, 11 Drawing Figures

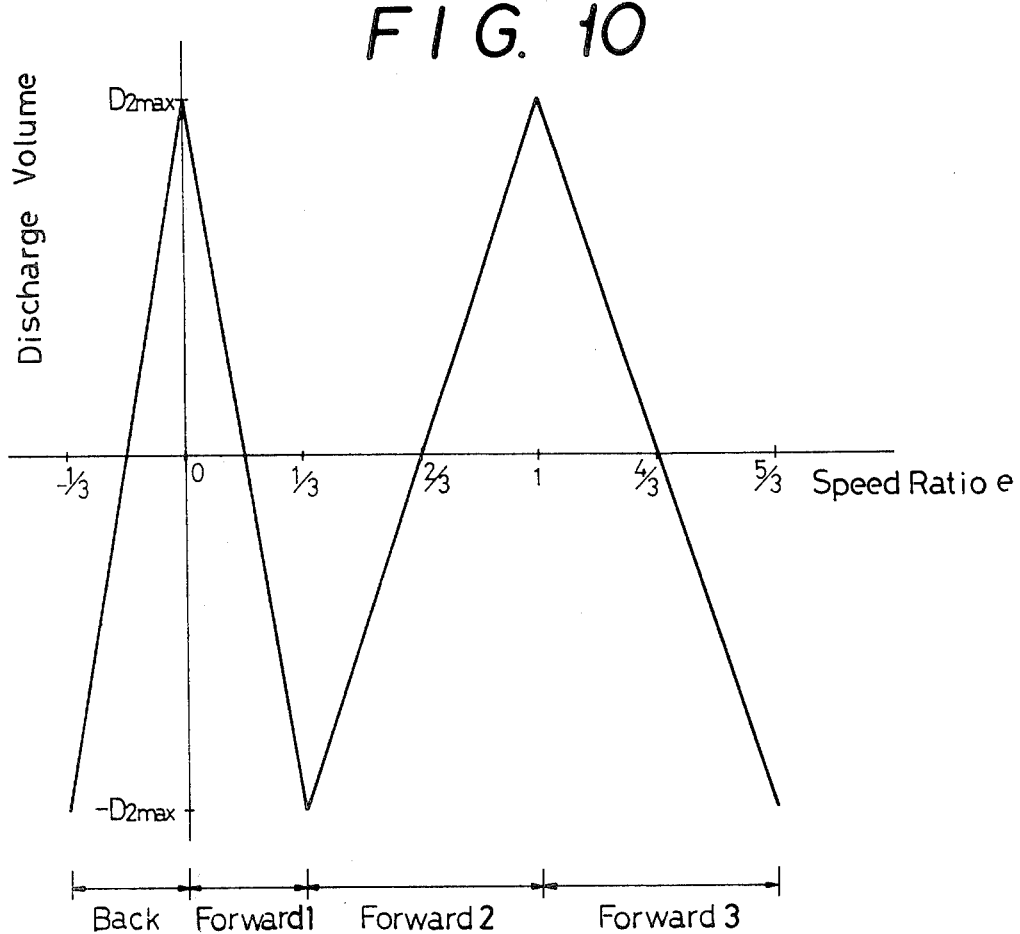

CONTROL SYSTEM FOR A STEPLESS VARIABLE SPEED TRANSMISSION

BACKGROUND OF THE INVENTION

The invention relates to a control system for a stepless variable speed transmission of power splitting type for use in a vehicle such as automobiles in which the power from a prime mover is transmitted with a controllable speed and wherein part of the power is converted into hydraulic power by means of hydraulic pump motor for controlling a speed ratio in a stepless or continuous manner.

For use with vehicles, hydraulic pump motor employed in a stepless transmission of power splitting type is subject to limitations that a large sized motor cannot be used and that it cannot be operated at a high speed of rotation. In the prior art practice, a mode conversion system is proposed in which a switching of power transmission control means such as clutch or brake is used in combination with a change of speed ratio regions in order to enable the achievement of an extensive range of speed control with a small size hydraulic pump motor which is operated at a low speed. When the mode conversion system is employed, it is necessary to achieve a synchronization between the drive end and the driven end of a clutch that is being engaged in order to avoid undue conditions during the clutch switching operation. A clutch is operated hydraulically, and an engaged clutch will be released simultaneously with the discharge of hydraulic oil while a released clutch cannot be immediately driven into engagement since an increase in the hydraulic pressure does not occur simultaneously with the supply of hydraulic pressure thereto but occurs rather gradually. Consequently, when a switching of clutches requires that one clutch be disengaged while another be engaged, it will be seen that if the hydraulic operations for the disengagement and the engagement take place concurrently, the both clutches may be released for a moment to cause the transmission to assume a neutral condition in which it is free from any load, causing a sudden rise in the speed of rotation of the prime mover, and resulting in a variety of drawbacks. On the other hand, in a conventional control system, the direction in which the piston of a speed ratio control actuator moves is switched simultaneously as the clutches are switched, giving rise to the likelihood that the control actuator may move in the opposite direction before the clutches are completely switched.

SUMMARY OF THE INVENTION

It is a first object of the invention to provide a control system for a stepless variable speed transmission of mode conversion type which assures a smooth switching of clutches.

It is a second object of the invention to provide a control system which assures a smooth switching of clutches as well as of the direction in which a speed ratio control actuator is to operate.

It is a third object of the invention to provide a control system capable of performing a speed ratio control in a stable manner in response to a target engine speed signal and an actual engine speed signal both of relatively low signal levels.

It is a fourth object of the invention to prevent a malfunctioning of a manual select valve which is used to establish various operations.

It is a fifth object of the invention to provide a control system which controls the discharge pressure of a hydraulic pump motor to a value which is desirable for the operation of the motor or the prime mover.

BRIEF DESCRIPTION OF THE DRAWINGS

FIG. 10 graphically shows the relationship between the discharge and the speed ratio of hydraulic pump motor; and FIG. 11 is a chart illustrating the various modes of operation of the stepless variable speed transmission shown in FIG. 1.

DESCRIPTION OF PREFERRED EMBODIMENT

Figure 1:
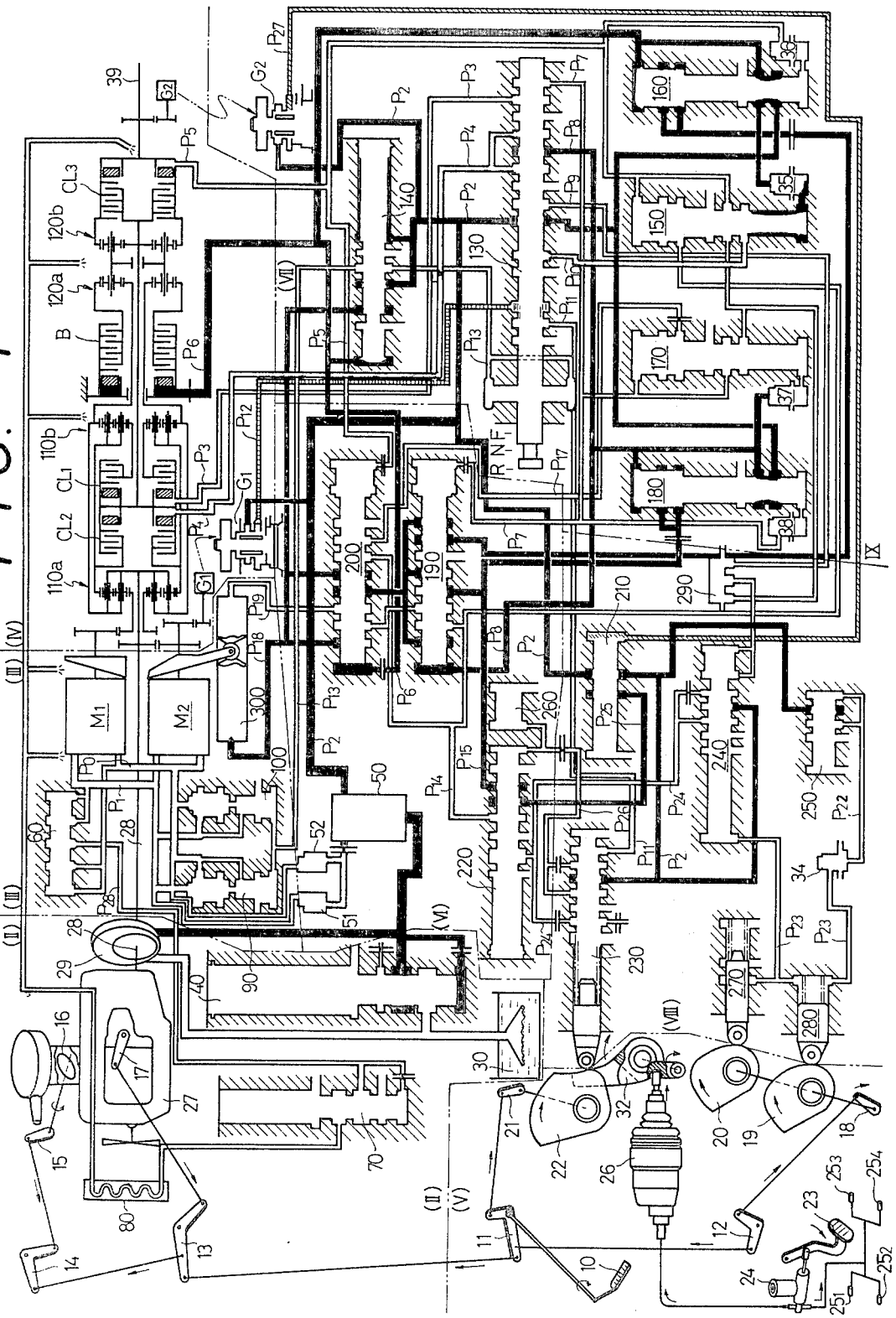
FIG. 1 is a schematic diagram of one embodiment of the invention.

Referring to FIG. 1, there is shown one embodiment of the invention. In the example shown, an accelerator pedal 10 is connected with an arm 11, which is in turn connected with arms 12 and 13. Arm 13 is connected with a throttle valve 16 through arm 14 and lever 15. Arm 13 is also connected with a lever 17 which controls the injection of a fuel pump for augumenting the amount of fuel. Arm 12 is connected through lever 18 with cams 19, 20 which are adapted to compensate for a lag in increasing the speed ratio. Arm 11 is also connected through lever 21 with another cam 22 which establishes a target engine speed. Directions in which the described components operate as the accelerator pedal 10 is depressed are indicated by arrows in FIG. 1. When a brake pedal 23 is depressed, an increase in the hydraulic pressure of a brake master cylinder 24 occurs and is transmitted to wheel cylinders, $25_1$ to $25_4$, and is also transmitted to an hydraulic chamber of an engine brake control cylinder 26. Engine 27 has a rotating shaft 28 which is connected with an oil pump 29.

Oil pump 29 withdraws oil from oil pan 30 and supplies hydraulic oil to a pressure control valve 40 and a filter 50. Hydraulic oil passing through the filter and which is maintained at a given pressure by means of the pressure control valve 40 is fed through check valves 51, 52 to the low pressure side of hydraulic pump motors M1 and M2, and is also fed to a constant pressure line P2. The input line and the output line of pump motors M1, M2 are connected with a shuttle valve 60, which feeds the low pressure (discharge oil) of the pump motors to a relief valve 70. Thus, the discharge oil from pump motors M1, M2 are fed as a lubricant to various parts through shuttle valve 60, relief valve 70 and cooler 80, and finally collects in the oil pan 30. Relief valve 70 operates to maintain the drive pressure (the lower side pressure) of pump motors M1, M2 constant. High pressure relief valves 90 and 100 are connected across the input and output lines of pump motors M1, M2, avoiding an excessively high hydraulic pressure from occurring.

Connected with the rotating shaft 28 of the engine 27 through gears are a governor valve G1, hydraulic pump motor M2 of a mechanical-hydraulic transmission which represents a stepless variable speed transmission, and first differential gearing 110a, 110b. Governor valve G1 supplies a hydraulic pressure to line P12 having a magnitude which depends on the rotational speed of the rotating shaft 28. First differential gearing 110a, 110b is coupled with clutches CL1 and CL2, and is also coupled with second differential gearing 120a, 120b which is in turn combined with a brake B and a clutch CL3. Governor valve G2 is connected with the output shaft 39 of the variable speed transmission through a gear and supplies a hydraulic pressure to line P27 having a magnitude which corresponds to the rotational speed of the output shaft 39.

Hydraulic pressure of a given level which prevails at the output of filter 50 is supplied through line P2 to a manual select valve 130, and is thence applied to an up shift valve 150 depending on the selected position of the valve 130. The constant pressure from line P2 and the output pressure of the governor valve G2 are applied to a throttle control valve 210, which determines a throttle opening in accordance with the output pressure of the governor valve G2. The hydraulic oil is thence applied to a speed ratio control valve 220 through line P25. In FIG. 1, numeral 34 indicates a check valve, 35 to 38 delay valves including orifices and check valves, and 300 an actuator.

In FIG. 1, thick lines indicate those lines to which the constant pressure from line P2 is applied when the manual select valve 130 assumes it neutral position N, and those lines which are hatched to indicate the lines which are supplied with a hydraulic pressure which corresponds to the rotational speed of the output shaft 39. Line shown with spaced transverse thin lines is supplied with a hydraulic pressure which corresponds to the rotational speed of the rotating shaft 28 of the engine.

The detailed construction of various parts shown in FIG. 1 is illustrated in FIGS. 2 to 9. It should be understood that sections in FIG. 1 which are partitioned by phantom lines and designated by numerals II to IX are shown in detail in FIGS. 2 to 9, respectively, and that by connecting these FIGS. 2 to 9 in a manner such that reference characters a1, b1, c1, c2 . . . which designate the hydraulic lines adjoin together, they constitute the overall system shown in FIG. 1.

Figure 2:
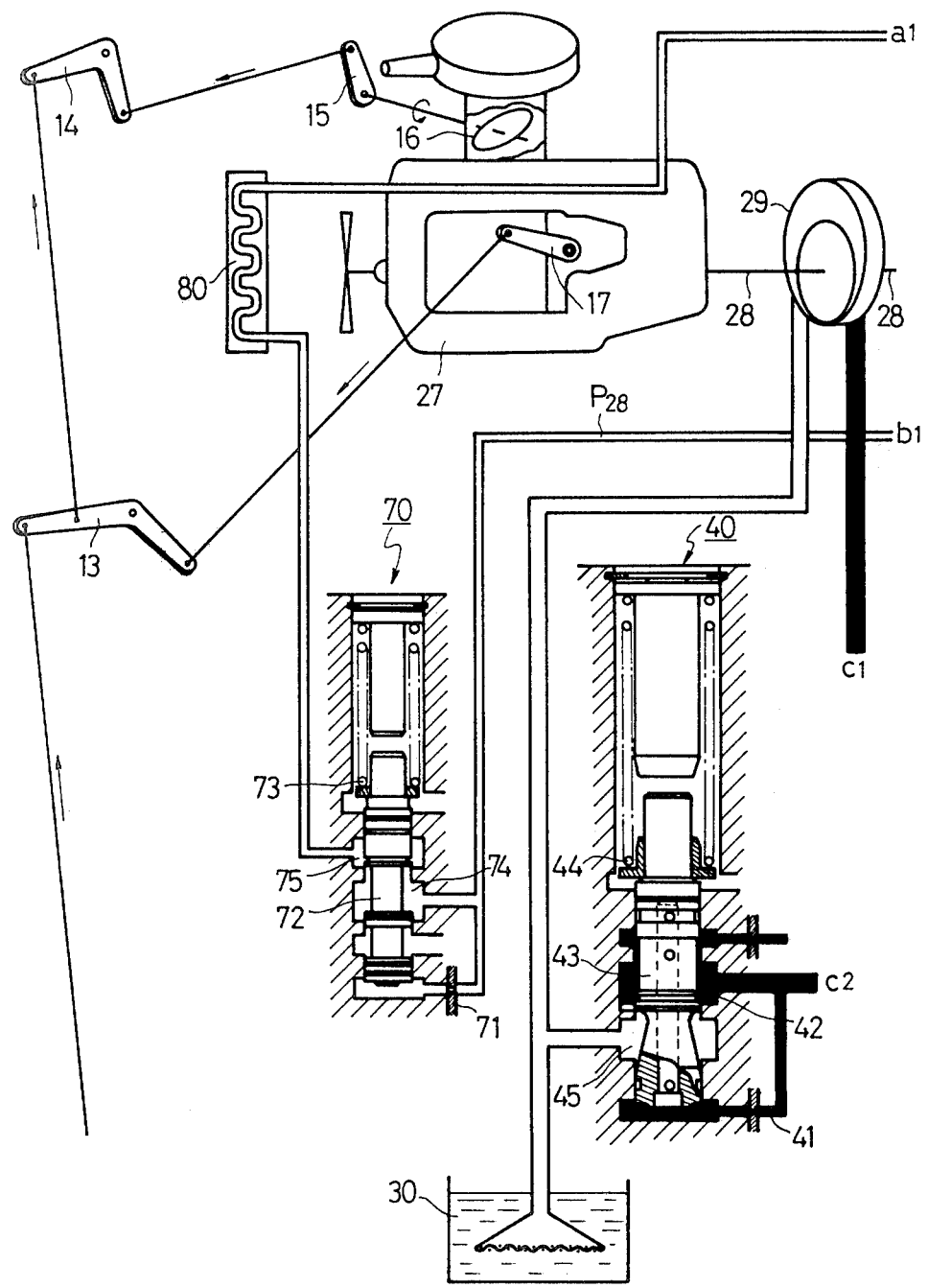
FIGS. 2 to 9 are schematic views illustrating the detailed construction of various parts shown in FIG. 1.

Referring to FIG. 2, the relief valve 70, to which the hydraulic pressure from the low side of pump motors M1, M2 are applied through the shuttle valve 60 (see FIG. 3), includes an orifice 71 which receives such pressure, and a piston 72 which is urged by a spring 73. Orifice 71 removes oscillating components from the input pressure, and the resulting pressure is applied to the lower surface of the piston 72. This urges piston 72 upward, which however is urged downward by the spring 73, so that when the output pressure from shuttle valve 60 exceeds a given value which is determined by the resilience of spring 73 and the configuration of piston 72, there occurs a flow of oil from an inlet 74 to an outlet 75, which feeds the cooler 80. Discharge oil from oil pump 29 is applied to an orifice 41 and inlet of 42 of the pressure control valve 40. After passing through orifice 41, the hydraulic pressure urges piston 43 upward, which however is urged downward by a spring 44. Consequently, when the input hydraulic pressure exceeds a given value, the piston 43 is driven upward from the position shown, communicating the inlet 42 with an outlet 45 to discharge the input pressure to the oil pan 30. When the input pressure reduces, the spring 44 causes the piston to move down, interrupting the communication between the inlet 42 and the outlet 45. Such operation maintains a constant hydraulic pressure, which is supplied to the filter 50 and which is thence applied to the various parts as a drive pressure.

Figure 3:
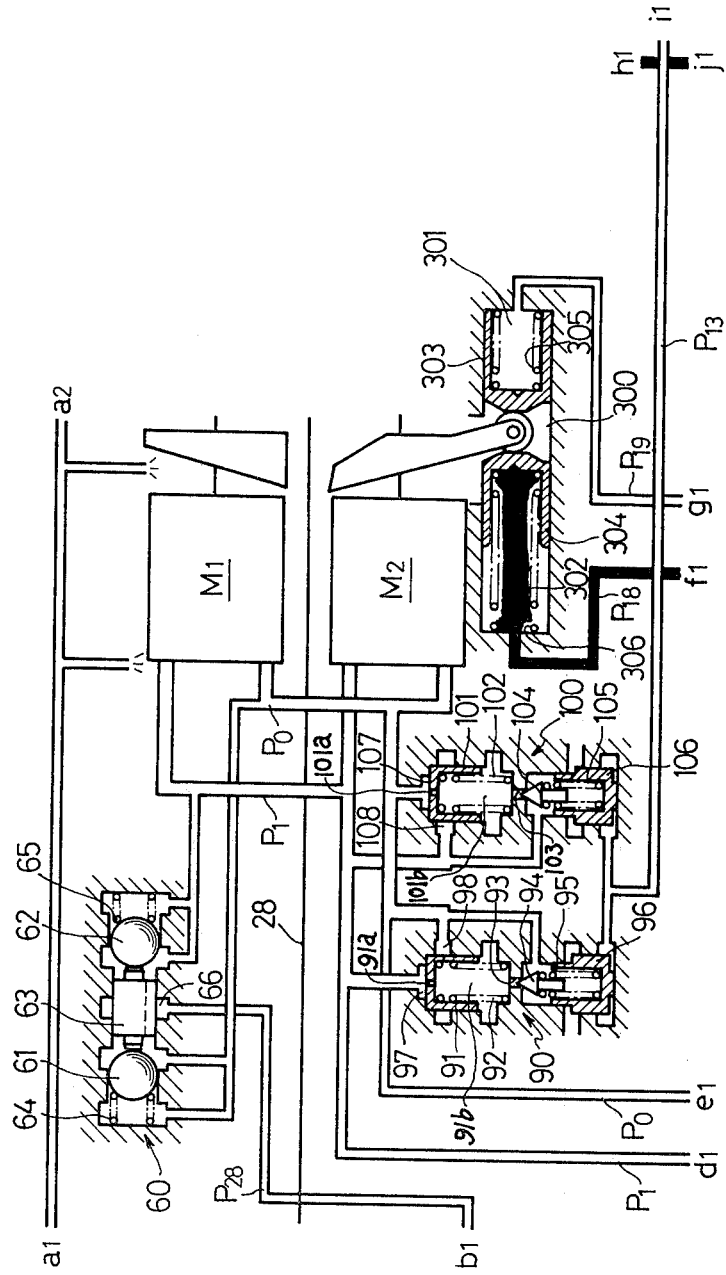

Referring to FIG. 3, pump motor M1 is of the type having a fixed discharge while pump motor M2 has a controllable discharge, which is controlled by the actuator 300. The line which supplies the hydraulic pressure from the filter 50 to pump motors M1, M2 through the check valves 51, 52 includes the high pressure relief valves 90 and 100 connected therein. High pressure relief valve 90 comprises a piston 91 having an orifice, spring 92, passage 93, pilot valve 94, spring 95 and piston 96. Hydraulic pressure from a selective constraining valve 140 is applied to the lower surface of the piston 96, and when it is high, the pilot valve 94 is strongly urged to close the passage 93. One of the line pressures of the pump motors M1, M2 is applied to the upper surface of the upper piston 91. High pressure relief valve 100 is constructed in the similar manner as valve 90 except that the other line pressure from pump motors M1, M2 is applied to the top surface of an upper piston 101. When the pressure of either one of the input or output lines of the hydraulic pump motors M1, M2 rises above the pressure of the other line, the upper piston 91 or 101 of either high pressure relief valve 90 or 100 will be moved down, providing a communication between the high pressure side 97 or 107 and the low pressure side 98 or 108, thus preventing an excessive pressure rise. Both the input and output lines of pump motors M1, M2 are connected with the shuttle valve 60, which comprises balls 61, 62, shuttle 63 and springs 64, 65. The hydraulic pressure from either input or output line of pump motors M1, M2 is applied to the ball 62 while the hydraulic pressure from the other line is applied to the ball 61. As a consequence, the balls 61, 62 and the shuttle 63 move toward the low pressure side, whereby an outlet 66 communicates with the low pressure side through a groove formed in the shuttle 63, thus allowing the oil of the lower pressure to be supplied through the outlet 66 to the relief valve 70.

The actuator 300 includes a right-hand chamber 301 and a left-hand chamber 302 disposed on the opposite sides of a swash plate controlling arm of the variable hydraulic pressure pump motor M2. Each chamber includes a piston 303 and a spring 305, or a piston 304 and a spring 306. These springs urge the pistons 303, 304 to move in opposite directions. The right- and the left-hand chamber 301, 302 are connected through hydraulic lines P19 and P18, respectively, with a diverting valve 200. When both lines P18 and P19 have an equal hydraulic pressure, the pistons 303, 304 will be maintained in their neutral position as a result of the resilience of the springs 305, 306 located within the actuator chamber, and consequently, the variable swash plate of pump motor M2 assumes it neutral position. The pistons 303, 304 move either to the right or to the left in accordance with a difference in the hydraulic pressures prevailing in lines P18 and P19, thus causing the swash plate to be inclined to the left or to the right. Pump motors M1, M2 are of a type using an axial piston, and the volume of pump motor M2 can be changed from $D_{2max}$ which is equal to the volume $D_1$ of pump motor M1 to $-D_{2max}$.

Figure 4:
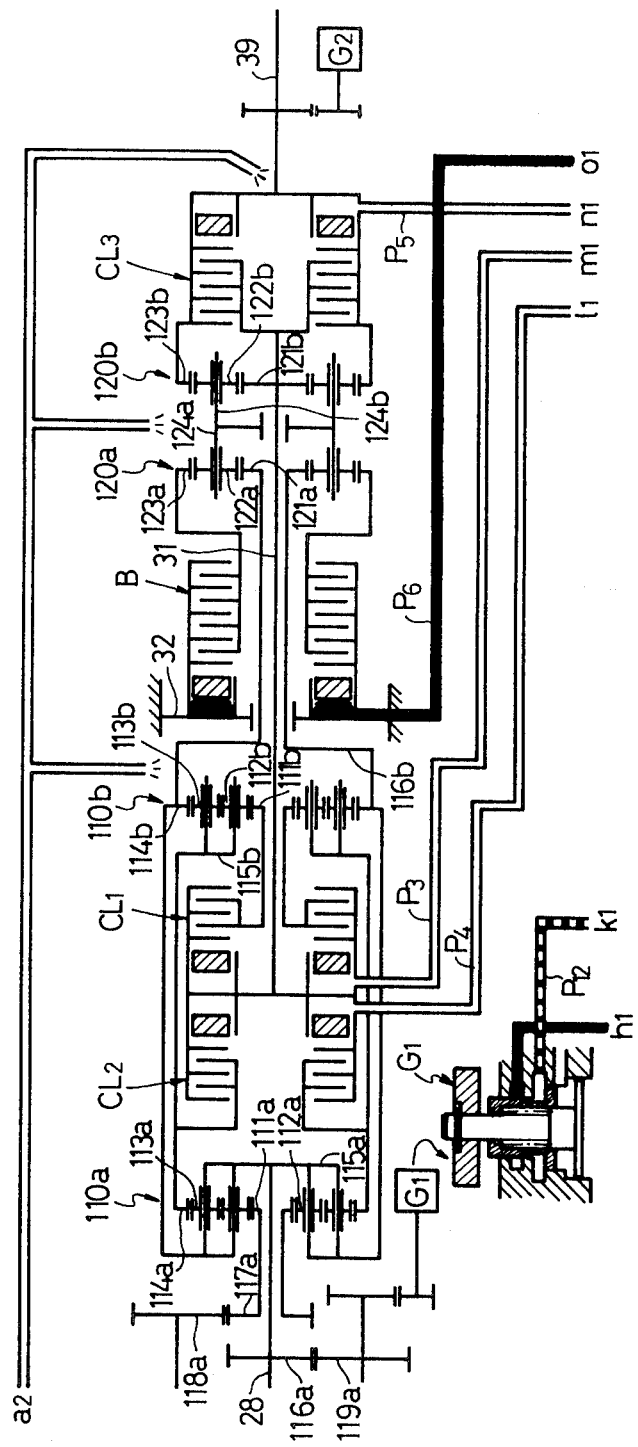

The rotating shaft of hydraulic pump motor M1 is connected through a gearing with first differential gearing 110a, 110b of the mechanical-hydraulic variable speed transmission which represents a stepless variable speed transmission and which is shown in FIG. 4. Specifically, the input shaft 28 is connected with first differential gearing 110a, 110b. It comprises a first planetary gear 110a which includes a sun gear 111a, a pinion 112a which meshes with the sun gear, a ring gear 114a which meshes with the pinion, another pinion 113a meshing with the first mentioned pinion, and a carrier 115 which carries the pinions 112a, 113a, and a second planetary gear 110b which includes a sun gear 111b, its meshing pinion 112b, another pinion 113b meshing with the first mentioned pinion, a ring gear 114b meshing with the pinion 113b, and a carrier 115b which carries the pinions 112b and 113b. The carrier 115a of the first planetary gear 110a is integrally connected with the ring gear 114b of the second planetary gear 110b, and is integrally coupled with the input shaft 28, as a first element of the first differential gearing 110a, 110b. The sun gear 111a of the first planetary gear 110a forms a second element of the first differential gearing 110a, 11b and is connected with the rotating shaft of the pump motor M1 through a set of gears 117a and 118a. The ring gear 114a of the first planetary gear 110a and the carrier 115b of the second planetary gear 110b are coupled together integrally to form a third element of the first differential gearing 110a, 110b. The sun gear 111b of the second planetary gear 110b forms a fourth element.

Clutches CL1 and CL2 are disposed intermediate the first planetary gear 110a and the second planetary gear 110b. First clutch CL1 achieves a connection or disconnection between the fourth element or the sun gear 110b of the first differential gearing and an intermediate shaft 31 which is coupled with the sun gear 121b of second speed reduction unit 120b of the second differential gearing 120a, 120b. Second clutch CL2 achieves a connection or disconnection between the intermediate shaft 31 and the third element, or ring gear 114a and carrier 115a, of the first differential gearing 110a, 110b. Disposed along the intermediate shaft 31 are first and second speed reduction units 120a, 120b of the second differential gearing as well as third clutch CL3.

First speed reduction unit 120a comprises a sun gear 121a which is integrally coupled with the first element of the first differential gearing or the carrier 115a and ring gear 114b, its meshing pinion 122a, ring gear 123a meshing with the pinion, and carrier 124a which carries the pinion 122a, thus forming a first planetary gear. Ring gear 123a can be connected with or disconnected from casing 32 by means of brake B. First speed reduction unit 120a performs a power transmission when brake B is engaged, but does not perform a power transmission when brake B is disengaged. Second speed reduction unit 120b comprises a sun gear 121b, pinion 122b, ring gear 123b and carrier 124b. Carrier 124b is integrally coupled with the carrier 124a of the first speed reduction unit 120a, and represents a first element of the second differential gearing 120a, 120b while the sun gear 121b represents a second element which is integrally coupled with the intermediate shaft 31. Ring gear 123b forms a third element which is integrally coupled with the output shaft 39. Third clutch CL3 achieves a connection or disconnection between the intermediate shaft 31 and the output shaft 39.

Clutches CL1, CL2 and CL3 and brake B are of a friction type which is brought into engagement under the hydraulic pressure. The hydraulic pressure is supplied to clutch CL1 from line P3, to clutch CL2 from line P4, to clutch CL3 from line P5 and to brake B from line P6.

In the individual planetary gears 110a, 110b, 120a and 120b, the ratio of the diameter of pitch circles of the sun gear and the ring gear is chosen such that $114a/111a = 3/1$, $114/111b = 123a/121a = 123b/121b = 2/1$. The ratio of the diameter of pitch circles of gear 118 to gear 117 is chosen equal to that of gear 119a to gear 116a.

The engagement of brake B and second clutch CL2 represents a first range in the forward direction, and the rotational speed of the output shaft 39 relative to that of the input shaft 28 or the speed ratio can be continuously increased from 0 to ⅓ by continuously varying the volume of pump motor M1 from $D_{2max}$ to $-D_{2max}$ as illustrated in FIG. 10. The speed ratio e can be further increased by engaging third clutch CL3 and disengaging brake B to establish a second range in the forward direction, as the volume of pump motor M2 is continuously varied from $-D_{2max}$ to $D_{2max}$ as illustrated in FIG. 10. When first clutch CL1 is engaged and second clutch CL2 disengaged at $D_{2max}$ to establish a third range in the forward direction, the speed ratio e is further increased as the volume of pump motor M2 is sequentially varied from $D_{2max}$ to $-D_{2max}$. By following an opposite procedure, the speed ratio e can be successively decreased. For a backward movement, first clutch CL1 is engaged and second clutch CL2 is disengaged to achieve a switching from the first range in the forward direction to a backward range. Such switching operation is achieved by the use of manual select valve 130 shown in FIG. 7.

Figure 7:
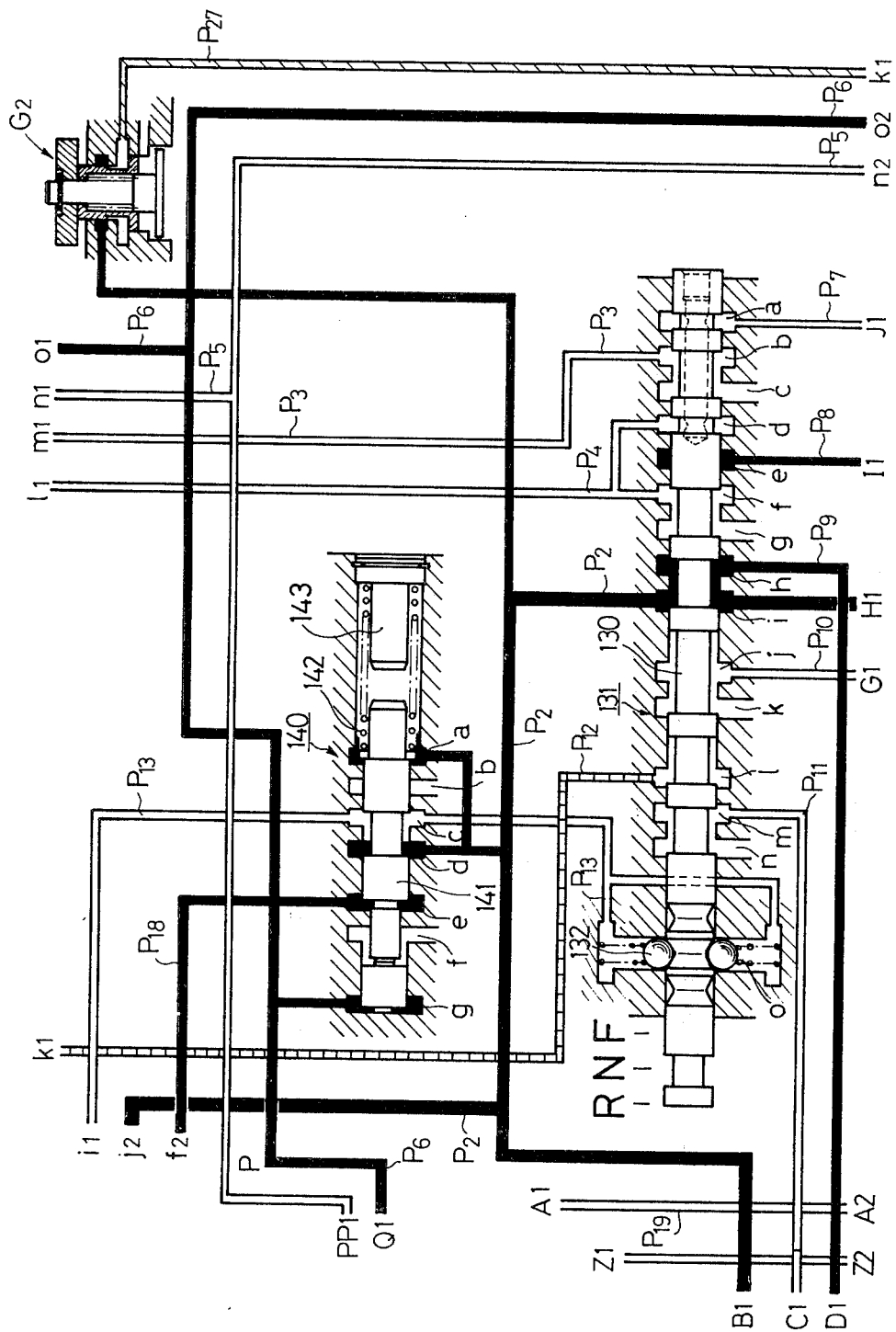

Referring to FIG. 7, the purpose of the manual select valve 130 is to control the communication between hydraulic lines P2 to P4, P12, drains (reservoirs) c, g, k, n and hydraulic lines P7 to P11. It includes a piston 131 and latch balls 132 which are spring biased. Piston 131 can be selectively brought into a reverse R, a neutral N and a forward F position by means of a manual shift mechanism. Piston 131 is shown in its neutral position N in Fog. 7. When a hydraulic pressure is applied to line P13 for purpose of locking, latch balls 132 are strongly urged into recesses formed in the piston 131, which is therefore locked. The locking pressure to line P13 is supplied from a selective locking valve 140. In the forward position F of piston 131, a communication is established between lines P3 and P7, between lines P4 and P8, between line P9 and drain g, between lines P10 and P2, and between lines P11 and P12. In the reverse position R, line P7 is disconnected from line P3, which is in turn disconnected from drain c and communicates with line P8 through an internal bore formed in the piston 131. Line P9 is disconnected from line P2 and communicates with drain g, line P10 communicates with drain k, and lines P11 and P12 communicate with each other. In the neutral position N, line P3 communicates with drain c while lines P4 and P10 communicate with drains g and k, respectively, as shown in FIG. 7. Lines P8 and P4 are disconnected from each other while line P9 communicates with the line P2, and line P11 communicates with the drain n.

Selective locking valve 140 includes piston 141, 143 and a spring 142. The hydraulic pressure from brake B is applied to port g through line P6 while the hydraulic pressure from the left-hand chamber of actuator 304 is applied to port e through line P18. A constant hydraulic pressure is supplied to ports a and d from line P2. In response to the hydraulic pressures from lines P18 and P16 which are opposed by the combination of the hydraulic pressure from line P2 and the resilience of spring 142, the piston 141 changes the pressure of line P13 or that of port c to a pressure prevailing in line P2 and drain b. Hydraulic pressure from line P13 is applied to latch balls 132 for detent purpose, and is also supplied to the high pressure relief valves 90 and 100 to determine their operational mode (that is, whether they act as a bypass valve or a relief valve). Specifically, when a locking pressure prevails in line P13, pilot valves 94, 104 close passages 93, 103, so that pistons 91, 101 act as relief valves. When the pressure prevailing in line P15 is low as when no locking operation takes place, the reduced resilience of the springs 95, 105 cause pilot valves 94, 104 to open, thus allowing them to act as bypass valves.

Figure 9:
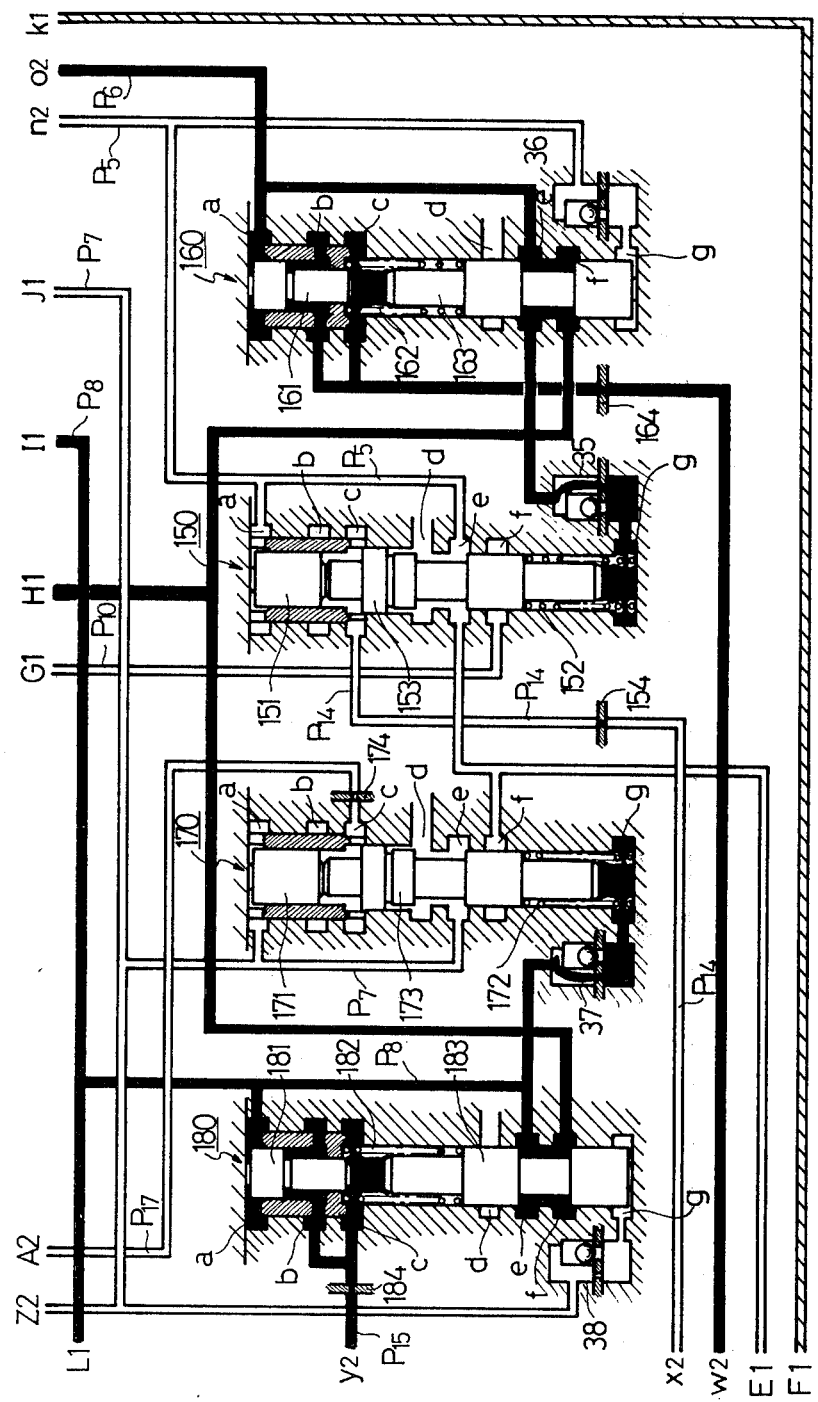

Up shift valve 150 shown in FIG. 9 comprises a self-holding piston 151, spring 152 and another piston 153. In response to a combination of the hydraulic pressure from line P5, the hydraulic pressure from line P14 which is passed through an orifice 154 and which acts to increase the speed ratio e, and the hydraulic pressure from line P6 (hydraulic pressure from brake B) which is passed through the orifice of delay valve 35, the valve 150 switches the pressure of line P5 between the pressure which prevail at drain d and line P10. When the pressure of line P14 moves piston 153 down, the pressure of line P5 is applied to the top surface of self-holding piston 150, whereby piston 153 is self-maintained in its loser position.

Down shift valve 160 comprises a self-holding piston 161, a spring 162 and another piston 163. In response to the hydraulic pressure from line P5 (hydraulic pressure of clutch CL3) which is passed through the orifice of delay valve 36 and which is opposed by the pressure prevailing in the left-hand chamber 302 of the actuator 300 in its first forward mode and which is fed through an orifice 164 and diverting valves 190, 200, the down shift valve 160 switches the pressure of line P6 communicating with brake B between a pressure which prevails at drain d and a pressure prevailing at port i of the manual select valve 130. As the hydraulic pressure of line P6 (hydraulic pressure of brake B) rises, it is applied to the top surface of the self-holding piston 161 through port a, causing a self-holding of piston 163.

Up shift valve 170 is constructed in the similar manner as the valve 150, and includes a piston 173 which is acted upon by the hydraulic pressure of line P14 (causing an increase in the speed ratio e) which is fed through an orifice 174, line P17 and diverting valve 200 in opposition to the hydraulic pressure of line P4 (hydraulic pressure of clutch CL2) which is fed through the orifice of delay valve 37, line P8, down shift valve 180, and port e of the manual shift valve 130. In response to a difference between these hydraulic pressures, the piston 173 is driven to switch the hydraulic pressure of line P7 between a pressures which prevail at drain d and in line P5. An increase in the pressure of line P7 causes a downward movement of the self-holding piston 171, causing an self-holding of piston 172.

Down shift valve 180 is constructed in the similar manner as the valve 160, and includes a piston 183 urged by the hydraulic pressure of line P15 (causing a decrease in the speed ratio e) which is passed through an orifice 184, in opposition to the hydraulic pressure of line P7 (the hydraulic pressure of clutch CL1 in the forward mode) which is passed through the orifice of delay valve 38. In response to a difference between these pressures, the piston 183 is driven to switch the pressure of line P8 between a pressures which prevail at drain d and at port i of the manual select valve 130. An increase in the pressure of line P8 moves the self-holding piston 181 down, causing a self-holding of piston 183.

Figure 6:
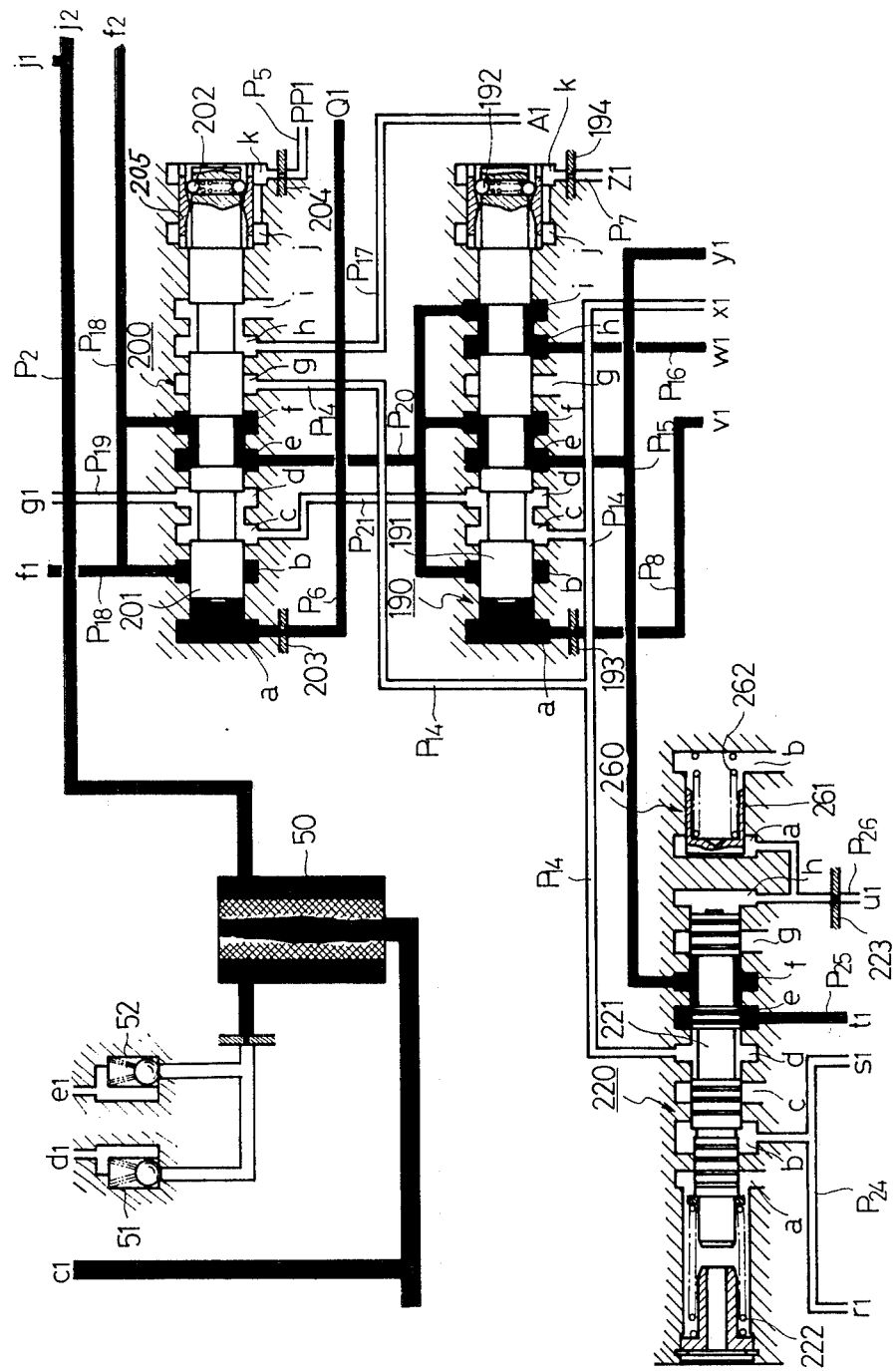

Diverting valve 200 is shown in FIG. 6, and includes a piston 201 and spring biased positioning balls 202. Also it includes a port k which is supplied with the hydraulic pressure of line P5 (the hydraulic pressure of clutch CL3) through an orifice 204, and also includes port a which is supplied with the hydraulic pressure of line P6 (the pressure of brake B) through an orifice 203. Piston 201 is driven in accordance with a pressure differential therebetween to assume either a right-hand position which is shown or an opposite, left-hand position depending on a certain level of the pressure differential, these positions being determined by the cooperation of the balls 202 with their opposing convex ring member 205. When the hydraulic pressure of line P6 is high (or when brake B is engaged), the piston 201 assumes the position shown in which line P19 leading to the right-hand chamber 301 of the actuator 300 communicates with line P21 while line P18 leading to the left-hand chamber 302 communicates with line P20 through ports f, e. When the pressure of line P5 is high (or when clutch CL3 is engaged), the piston 201 assumes its leftmost position in which a communication is established between lines P19 and P20 and between lines P18 and P21.

Directional control valve 190 comprises a piston 191 and spring biased positioning balls 192. In addition, it includes a port k to which the hydraulic pressure from line P7 (the pressure prevailing at port a of the manual select valve 130) is applied through an orifice 194, and also includes another port a to which the hydraulic pressure of line P8 (the pressure prevailing at port e of valve 130) is applied through an orifice 193. The piston 191 is driven in accordance with a pressure differential therebetween. Directional control valve 200 provides a communication between lines P18 and P20, between lines P19 and P21, and between line P17 and drain i in its reverse position R, neutral position N and in the first forward mode (see FIG. 10). In the second and third forward modes, it provides a communication between lines P18 and P21, between lines P19 and P20, and between lines P14 and P17. The directional control valve 190 provides a communication between lines P21 and P14, between lines P20 and P15 and between lines P16 and P20 in its reverse position R, neutral position N and in the first and second forward modes. In the third forward mode, it provides a communication between lines P20 and P14, between lines P15 and P21, and between line P16 and drain g.

Speed ratio control valve 220 comprises a piston 221 and a spring 222. Differential control valve 240 supplies a hydraulic pressure from line P24 to the piston 221. Speed ratio control pilot valve 230 supplies a hydraulic pressure thereto through an orifice 223 and line P26. The piston 221 is driven in accordance with a difference between the hydraulic pressure supplied through line P24 combined with the resilience of spring 222 and the hydraulic pressure from line P26, and selectively connects lines P14, P15 with an input line P25. The hydraulic pressure from line P26 which is passed through an orifice 223 is applied to port a of an accumulator 260, which then urges a piston 261. The resulting movement of piston 261 achieves an adjustment of an initial rise in the hydraulic pressure prevailing at port h which is applied to piston 221.

Figure 5:
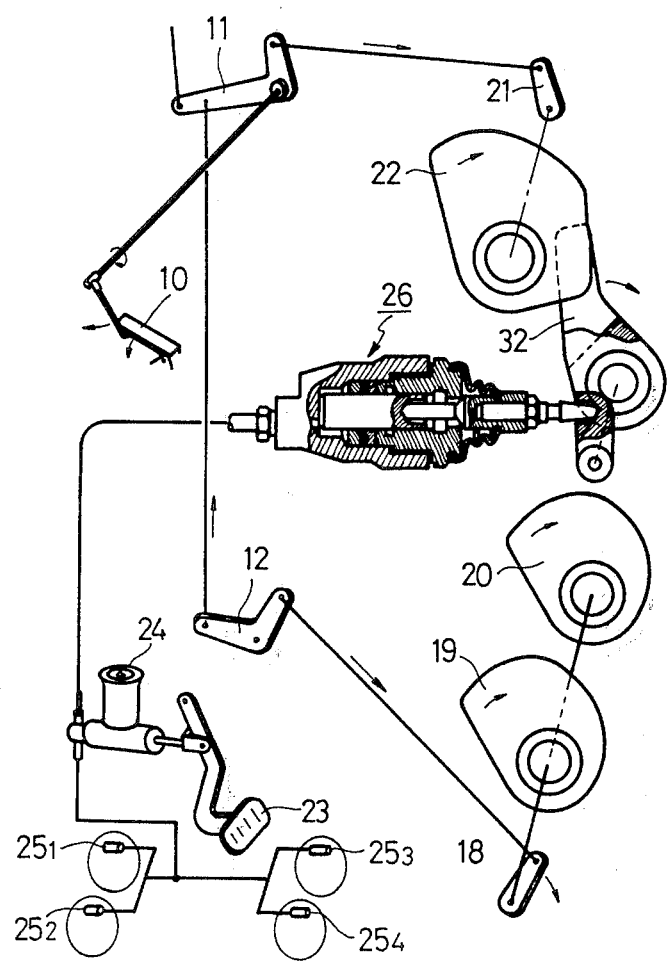
Figure 8:
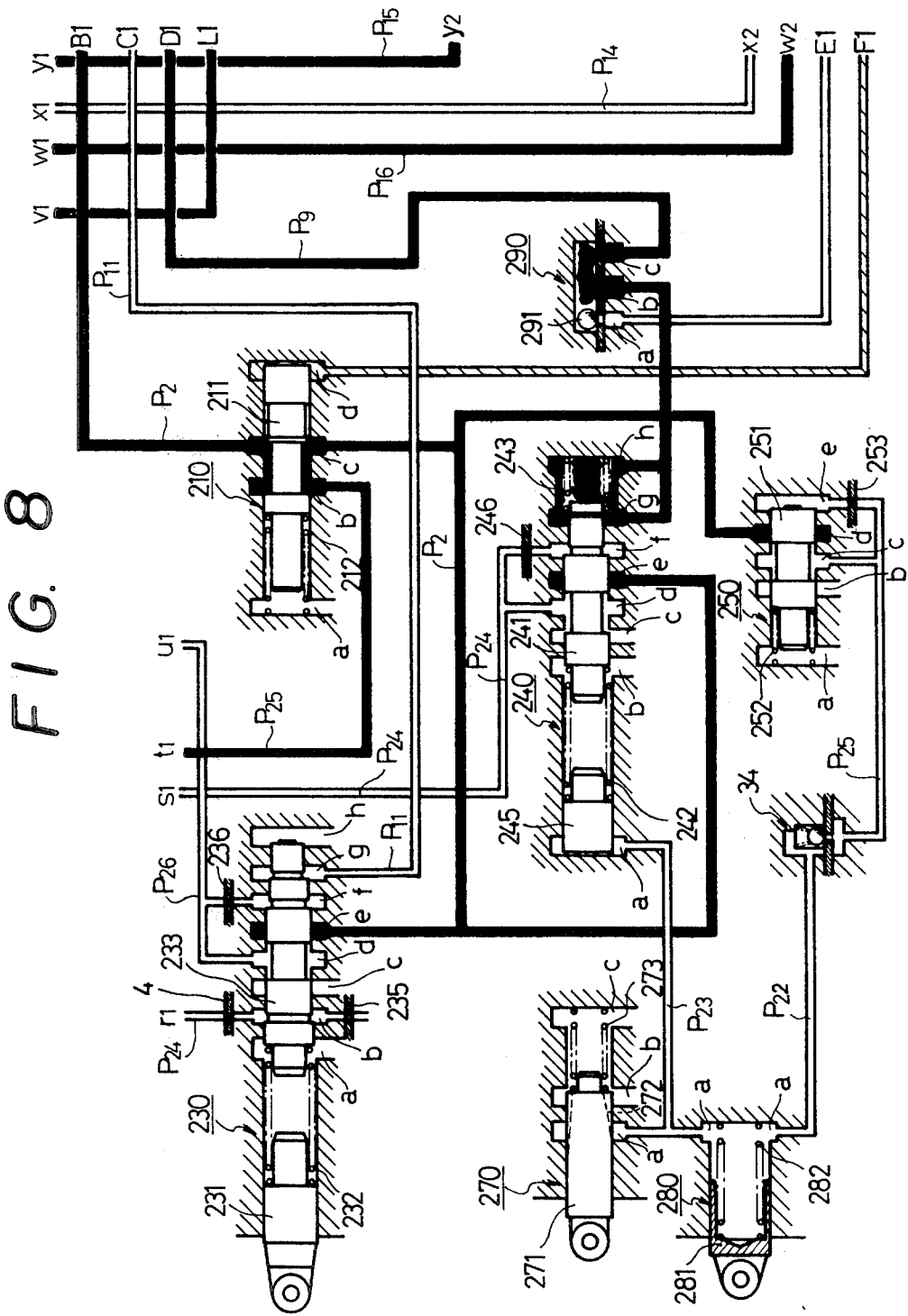

Cams 19, 20 and 22 are shown in FIG. 5 and angularly move as the accelerator pedal 10 is depressed. The purpose of cams 19 and 20 is to compensate for a lag while cam 22 has a profiled surface which establishes a target engine speed corresponding to the degree of depression of the accelerator pedal 10. These cams 19, 20 and 22 drive the piston 281 of a signal piston 280, the piston 271 of an orifice valve 270 and the piston 231 of the speed ratio control pilot valve 230, respectively, which are shown in FIG. 8. In response to the hydraulic pressure which prevails in the brake master cylinder 24 as the brake pedal 23 is depressed, the engine brake control cylinder 26 angularly drives the arm 32 to drive the piston 231 of pilot valve 230 inwardly, independently from the cam 22.

Referring to FIG. 8, the signal piston 280 comprises a piston 281 which moves in following relationship with cam 19, and also includes a spring 282. When piston 281 is rapidly driven, there occurs a pressure rise in its port a. Orifice valve 270 includes a piston 271, which moves in following relationship with cam 20, and a spring 273. Piston 271 is formed with a bevelled groove 272 which discharges the oil from port a to drain b. As piston 271 is driven inward, port a is increasingly closed. The signal piston 280, the orifice valve 270 and the cams 19, 20 operate to produce a hydraulic pressure in line P23 which corresponds to the derivative of the degree of depression of the accelerator pedal 10 or the derivative of the opening of the throttle valve 16. The pressure of line P23 is applied to port a of the differential control valve 240.

Differential control valve 240 comprises a piston 241, springs 242, 243 and another piston 245. It controls the hydraulic pressure of line P2 in a manner corresponding to the hydraulic pressure of line P23, and produces an output on line P24. Specifically, a hydraulic pressure which corresponds to the derivative of the throttle opening is applied to the left-hand end face of piston 245 through line P23 and port a, the piston 245 then acting through spring 242 to urge the left-hand end face of piston 241. In opposition thereto, the hydraulic pressure of line P24 is applied to port f through an orifice 246. Also applied to the right-hand end face of piston 241 is a hydraulic pressure from line P9 or line P5 whichever is higher, through ports g and h and switching valve 290. The pressure of line P9 is under a constant value which prevails in line P2 only in the neutral position N of the manual select valve 130. In the reverse and forward modes, the pressure of line P9 is low since it is connected with drain g. Since line P5 is energized with the hydraulic pressure of clutch CL3, the hydraulic pressure of line P2 is controlled for output on line P24 when the clutch CL3 is disengaged or the pressure P5 is low during the reverse or the first forward mode. The hydraulic pressure of line P24 is applied to port b of the speed ratio control valve 220 and port b of the pilot valve 230. Reducing valve 250 comprises a piston 251 and a spring 252, and operates to adjust the hydraulic pressure of line P22. Port e functions to supply a hydraulic pressure to the right-hand end face of piston 251, and is connected with port c through an orifice 253. The combination of reducing valve 250 and check valve 34 produces a derivative of a rapid depression of the accelerator pedal 10 which is output on line P23, an arrangement being made such that no negative pressure is produced within line P23 when the accelerator pedal 10 is released or when the throttle valve 16 is closed. During the time the signal piston 281 projects or is driven outwardly, the oil is supplied from check valve 34 and port c of reducing valve 250 to the signal piston 280.

Speed ratio control pilot valve 230 comprises a piston 231 which is driven by cam 22 and arm 32, a spring 232 and another piston 233. A force corresponding to a target engine speed which in turn corresponds to the degree of depression of the accelerator pedal 10 is applied through spring 232 to the piston 233, in opposition to the hydraulic pressure of line P11 which corresponds to the actual engine speed, and the pressure differential therebetween determines the position of piston 233, which regulates the hydraulic pressure of line P2 (through ports e-d) for output on line P26. The hydraulic pressure of line P26 is applied to port h of the speed ratio control valve 220 in the form of a hydraulic pressure having a primary lag caused by an orifice 223 and an accumulator 260. Thus speed ratio control pilot valve 230 detects any difference between the pressure corresponding to a target engine speed and an output hydraulic pressure of the governor G1 which corresponds to the actual engine speed, and amplifies it for application to port h of control valve 220. Differential control valve 240 supplies a hydraulic pressure which is equivalent to the derivative of the throttle opening (in the opening direction) to port b of speed ratio control valve 220. As a consequence, the piston of control valve 220 is controlled by a hydraulic pressure corresponding to a difference between the target engine speed and the actual engine speed which is applied to its port h, or is controlled by the combination of the hydraulic pressure of line P26 and the hydraulic pressure of line P24 which corresponds to the derivative of the throttle opening, thereby providing a combination between port d (line P14) and port e (line P25) and between port f (line P15) and drain g or alternatively providing a communication between the port d (line P14) and drain c and between port f (line P15) and port e (line P25). In the former instance, namely, when line P14 communicates with line P25, an increase in the speed ratio e is commanded while in the latter instance or when line P15 communicates with line P25, a decrease in the speed ratio e is commanded.

Throttle control valve 210 comprises a piston 211 and a spring 212. An output hydraulic pressure from the governor G2 is applied to the right-hand end face of the piston 211 through port d, thereby controlling the degree of communication provided between ports b and c in accordance with such pressure. The flow which is controlled in accordance with this degree of communication is outputted on line P25 from line P2. In other words, a flow which is controlled in accordance with the rotational speed of the output rotating shaft 39 of the variable speed transmission appears on line P25.

The operation of various parts and components which are shown in FIG. 1 and which have been described above in connection with FIGS. 2 to 10 will now be described. Initially, the operation of the manual select valve 130 and the selective locking valve 140 will be considered. In the neutral position N (see FIG. 7) of piston 131 of the manual select valve 130, its port b communicates with drain c, whereby the hydraulic pressure of line P3 is low to maintain first clutch CL1 disengaged. Similarly, port f communicates with drain g, whereby second clutch CL2 is also disengaged. Port h communicates with port i, whereby the constant pressure of line P2 is applied to line P9 while the hydraulic pressure of line P10 is low since port j communicates with drain k. Port m communicates with drain n so that the hydraulic pressure of line P11 is low. As a consequence, the constant pressure of line P2 is applied to the various ports as indicated in thick lines in FIGS. 2 to 9, achieving the engagement of brake B. The pressure of brake B is supplied through line P6 to port g of the selective locking valve 140, the port e of which is supplied with the pressure of the left-hand chamber 302 of the speed ratio control actuator 300 through line P18. When the pistons 303 and 304 of the actuator 300 assume their right most position, the discharge of variable pump motor M2 is at its maximum $D_{2max}$. In the neutral position N and during the idling in either reverse or forward mode R, F, a target engine speed which is determined by cam 22 is established at a slightly higher level than the idling speed to cause the speed ratio control valve 220 to produce a speed ratio reduction command. Specicifally, a communication is established in the control valve 220 between line P15 (port f) and line P25 (port e) so that the hydraulic pressure of left-hand chamber 302 of the actuator 300 or the hydraulic pressure of line P18 is made equal to the constant pressure of line P2 through a path including line P18, ports f and e of directional control valve 200, line P20, ports f and e of directional control valve 190, line P15, ports f and e of speed ratio control valve 220, line P25, ports b and c of pressure regulating valve 210 and line P2.

The pressure prevailing in the right-hand chamber 301 of the actuator 300 or the hydraulic pressure of line P19 is made equal to the drain pressure through a path including line P19, ports d and c of control valve 200, line P21, ports d and c of control valve 190, line P14 and ports d and c of speed ratio control valve 220. In the neutral mode, the selective locking valve 140 has its ports g, e and a supplied with the constant pressure from line P2. Ports g and e supply the hydraulic pressure to the piston 141, which is opposed by the combination of the hydraulic pressure acting thereon through port a and the resilience of spring 142. In response to a difference in these opposing forces, pistons 141 and 143 move to the left, providing a communication between port c and drain b, whereby no hydraulic pressure is produced in line P13 which is connected with port c. Consequently, the balls 132 of the manual select valve 130 are not strongly urged against the piston 131, which can therefore be manually moved to the forward position F or the reverse position R.

In the reverse position R of the piston 131 of the manual select valve 130, the output pressure from the governor G1 which corresponds to the actual engine speed is applied to port g of the speed ratio control pilot valve 230 through a path including line P12, ports l and m of the valve 130 and line P11. A communication is established within the select valve 130 between port j and drain k, between port h and drain g, between port d and drain c and between pors e and b, whereby the lines P10, P9 and P4 assume a drain pressure (low pressure). A communication is established between lines P3 and P8. Because it assumed a neutral position before it is shifted to the reverse position R, when it is switched to the reverse position R, line P7 assumes a drain pressure, and the hydraulic pressure of line P2 is supplied to line P8 from port i of the select valve 130 through the down shift valve 180. Thus, lines P8 and P3 assumes the same pressure as line P2. As a consequence, the clutch CL1 is engaged. Brake B is engaged during the neutral position N, and remains engaged during the reverse position R. Consequently, a gear train during the reverse mode is defined by the first and second differential gearings 110a, 110b and 120a, 120b located between the input shaft 28 and the output shaft 39. Upon starting during the reverse mode, the depression of the accelerator pedal 10 drives the piston 231 of the speed ratio control valve 230 inwardly to compress spring 232. The target engine speed increases to a value which corresponds to the degree of depression of the accelerator pedal. The actual engine speed also begins to increase as the pedal is depressed. An increase in the actual engine speed or an increase in the output hydraulic pressure of governor G1 (lines P12-P11) causes a difference between the target and the actual engine speed to begin to decrease until the former exceeds the latter. Thereupon the hydraulic pressure which is supplied by the pilot valve 230 to line P26 reduces below a value which locates the piston 221 of control valve 220 in its neutral position against the resilience of spring 222, whereby the piston 221 is driven to the right, applying the hydraulic pressure of line P25 to line P14. The hydraulic pressure of line P19 is increased through a path including line P25, line P14, ports c and d of control valve 190, line P21, ports c and d of control valve 200 and line P19. The hydraulic pressure of line P18 is reduced through a path including line P18, ports f and e of control valve 200, line P20, ports f and e of control valve 190, line P15 and ports f and g of line speed ratio control valve 220, whereby the pistons 303, 304 of the actuator 300 move to the left. In other words, the swash plate of pump motor M2 is controlled to increase the absolute magnitude of the speed ratio. A decrease in the hydraulic pressure of line P18 causes a reduced pressure in the port e of the selective locking valve 140, whereby the piston 141 moves to the left, providing a communication between ports c and d. The hydraulic pressure of line P2 is then applied to line P13, and the balls 132 of the select valve 130 are hydraulically urged to lock the piston 131, which is therefore rendered manually inoperable (or latched).

When shifting the piston 131 of the valve 130 from the neutral position N to the forward position F, line P12 communicates with line P11, and line P10 is disconnected from drain k and communicates with line P2 through port i. Line P9 communicates with drain g through port h, line P4 communicates with line P8, and line P3 communicates with line P7. This brings forth the engagement of clutch CL2 while brake B continues its engagement which is established during the neutral position N. In the forward position F, the hydraulic pressure of line P2 is applied to line P13 in the similar manner as in the reverse mode, as the speed ratio begins to increase. Consequently, balls 132 disable a manual operation of the piston 131 (which is therefore latched). The piston 131 is unlocked only when the pressure of line P6 assumes that of line P2 (brake B engaged) and line P18 assumes a high pressure (or when pistons 303, 304 of the actuator 300 assume their rightmost positions), namely, only in the neutral mode N, upon starting of the first forward mode and the reverse mode. In other words, the valve 130 is unlocked and can be operated when the vehicle is at rest or is running at a very low speed.

In the prior art arrangement, the piston 131 of the manual select valve has been locked by merely spring biasing the balls 132. This involved an inadvertent operation that the piston 131 may be shifted during the running in the forward or reverse direction. However, in accordance with the invention, the piston 131 is unlocked only in the neutral mode N, and upon starting in the first forward and the reverse mode, as mentioned previously, and it is locked by balls 132 at other times, so that an inadvertent connection with the manual select lever during the running does not operate the piston 131, thus avoiding a change in the speed range.

A reference is made to FIG. 10 for a description of the speed ratio controlling operation during the reverse mode and the first to third forward modes. At the time of starting, 1-2 up shift valve 150, 2-1 down shift valve 160, 2-3 up shift valve 170 and 3-2 down shift valve 180 assume their positions shown under the influence of their associated springs 152, 162, 172 and 182, respectively. In the forward position F of the piston 131, a communication is established between lines P6 and P2, whereby brake B is engaged. Line P5 communicates with drain d of valve 150 to disengage clutch CL3. Line P3 communicates with line P7 and also with drain d of valve 170, whereby clutch CL1 is disengaged. Line P4 communicates with line P3 and hence communicates with line P2 through ports e and f of valve 180 to establish the engagement of clutch CL2.

In the reverse position R, line P3 associated with clutch CL1 communicates with line P2 through line P8, and hence clutch CL1 becomes engaged. Line P4 communcates with drain c of the select valve 130 to disengage clutch CL2. Line P5 communicates with drain d of valve 150 to disengage clutch CL3, and line P6 communicates with line P2 through ports e and f of valve 160 to establish the engagement of brake B.

The 1-2 directional control valve 200 and the 2-3 directional control valve 190 are switched in accordance with the relative magnitude of the hydraulic pressures in lines P6 and P5 and in lines P8 and P7, respectively. Therefore, at the time of starting in either forward or reverse mode, the piston 201 of control valve 200 assumes its rightmost position shown. Piston 191 of control valve 190 assumes its rightmost position shown in either forward or reverse mode.

In the first forward mode, the speed ratio control valve 220 issues a speed ratio increase command in the form of a hydraulic pressure which is applied to the right-hand chamber 301 of the actuator 300 through lines P14, P21 and P19 while a hydraulic pressure indicative of a speed ratio decrease command is fed from the speed ratio control valve 220 to the left-hand chamber 302 of the actuator 300 through lines P15, P20 and P18. A trigger signal which is used to shift up from the first forward to the second forward mode and which is supplied in the form of a hydraulic pressure from line P14, is applied to port c of 1-2 up shift valve 150 through orifice 154, and line P14 communicates with line P19 through line P21. A hydraulic pressure of line P17, which is applied to port c of 2-3 up shift valve 170 as a trigger signal which shifts up from the second forward to the third forward mode, is maintained in communication with drain i of 1-2 directional control valve 200 in the first forward mode, and hence 2-3 up shift valve 170 is not actuated. A hydraulic pressure of line P15, which is used as a trigger signal which switches the 3-2 down shift valve 180, is applied to ports b, c thereof, but remains without effect since piston 183 cannot move downwardly of the position shown. A hydraulic pressure of line P16, which is used as a trigger signal which switches the 2-1 down shift valve 160, is applied to ports b and c thereof, but remains without effect since piston 163 cannot move downward of the position shown. As a consequence, in the first forward mode (0≦speed ratio ≦⅓), only the 1-2 up shift valve 150 is operable. In the similar manner, during the reverse mode, a speed increase command in the form of the hydraulic pressure of line P14 and a speed ratio decrease command in the form of the hydraulic pressure of line P15 are applied to the actuator 300 through paths which are similar to those described in connection with the first forward mode. The trigger signals which are applied to the individual shift valves 150, 160, 170 and 180 are similar to those used durig the first forward mode, but line P10 which supplies its hydraulic pressure to 1-2 up shift valve 150 communicates with drain k of select valve 130, so that if 1-2 up shift valve 150 shifts in response to the hydraulic pressure from line P14 during the reverse mode to establish a communication between ports e and f, line P5 assumes the drain pressure (P10) and hence the engagement of clutch CL3 cannot occur. Stated differently, a switching of clutches cannot occur during the reverse mode. In the first forward mode, the speed ratio control pilot valve 230 effects a comparison between the actual engine speed (P11) and the target engine speed (the resilience of compressed spring 232), and causes the pistons 303, 304 of the actuator 300 to be driven to the left to increase the speed ratio e if the former exceeds the latter. Specifically, when the actual engine speed increases gradually and ultimately exceeds the target speed, the piston 233 of pilot valve 230 is driven to the left, whereby line P26 communicates with drain c. Also, the piston 221 of the speed ratio control valve 220 moves to the right, whereby line P14 communicates with lines P25 and P2, and hence the hydraulic pressure of the right-hand chamber 301 of the actuator 300 is increased through a path including lines P14, P21 and P19 while the hydraulic pressure of the left-hand chamber 302 of the actuator 300 is reduced through a path including lines P18, P20 P15 and drain g of control valve 220, whereby the pistons 303, 304 of the actuator 300 begin to move to the left. Thus, the rotational speed of the output shaft 39 increases. If the actual engine speed exceeds the target engine speed when the pistons 303, 304 reach their leftmost positions, there occurs a sharp rise in the pressure of lines P19, P21 and P14 which ultimately becomes equal to the hydraulic pressure of line P2. Thereupon, piston 153 of the 1-2 up shift valve 150 moves down, whereby port e is disconnected from drain d and communicates with port f. As a consequence, the hydraulic pressure of lines P10–P2 is applied to line P5, achieving the engagement of clutch CL3. The pressure of line P5 is applied to port a, whereby piston 151 is driven downward, causing a self-holding of the piston 153. The hydraulic pressure of line P5 is also applied to delay valve 36, and is transmitted to port g of the 2-1 down shift valve 160 with a certain amount of time delay for the passage of hydraulic fluid through the orifice of valve 36 since the ball thereof blocks a large diameter passage thereof. The piston 163 of valve 60 then moves up to communicate port e with drain d, whereby the pressure of line P6 is reduced to disengage brake B. Additionally, that pressure is passed through the large diameter passage of delay valve 35, whereby the pressure prevailing at port g of valve 150 becomes equal to the drain pressure. In this manner, brake B is disengaged at a certain time interval after the engagement of clutch CL3. The hydraulic pressure of line P5 is passed through orifice 204 to be applied to port k of 1-2 diverting valve 200, the port a of which communicates with drain d of valve 160 through orifice 203 and line P6, so that the piston 201 of valve 200 moves to the left with a certain time delay after the pressure rise of line P5, providing a communication between lines P18 and P14 through line P21, and between lines P19 and P15 through line P20. Consequently, the pistons 303, 304 of the actuator 300 move to the right in response to a hydraulic pressure P14) which represents a speed ratio increase command. There is no change in the hydraulic pressures of clutches CL1 and CL2, so that the piston 191 of the 2-3 directional control valve 190 remains in its rightmost position as before. As a result of a change in the flow path (P14-P18, P15-P19), the hydraulic pressure of line P14 changes from the pressure value of line P2 to a reduced value which is approximately one-half that value. However, the hydraulic pressure of clutch CL3 or a hydraulic pressure which is equal to the pressure of line P2 is applied to port a of the 1-2 up shift valve 150 through line P5, and the delay valve 35 now acts such that port g which provides a rapid discharge of the hydraulic pressure communicates with drain d of valve 160, so that the pistons 151, 153 of the 1-2 up shift valve 150 are maintained in their lower position. The above procedure completes a switching of clutches or a shift-up from the first forward to the second forward mode.

It has been described that during the first forward mode, the speed ratio e is increased by driving pistons 303, 304 of the actuator 300 to the left, but during the second forward mode, a corresponding increase occurs by driving the pistons 303, 304 to the right. When a hydraulic pressure indicating a speed ratio increase command is maintained on line P14 after the speed ratio increases during the second forward mode and when pistons 303, 304 reach their rightmost postions, the 2-3 up shift valve 170 operate in the similar manner as mentioned previously in connection with the 1-2 up shift valve 150, and the 3-2 down shift valve 130 operates in the similar manner as mentioned previously in connection with the 2-1 down shift valve 160, thereby achieving the engagement of clutch CL1 and the subsequent disengagement of clutch CL2 with a certain time delay to establish the third forward mode. Clutch CL3 remains unchanged as it is engaged during the second forward mode. With this switching of clutches, the hydraulic pressure of line P3 rises while the hydraulic pressure of line P4 decreases, causing a pressure rise in line P7 and a pressure decrease in line P5. After a time delay which is determined by orifices 194, 193, the piston 191 of 2-3 directional control valve 190 moves to the left, providing a communication between lines P19-P20 and line P14, and between lines P18-P21 and line P15. (As before, the piston 201 of the 1-2 directional control valve 200 assumes its leftmost position.) Consequently, during the third forward mode, a hydraulic pressure of line P14 which represents a speed ratio increase command is applied to the right-hand chamber 301 of the actuator 300. Consequently, pistons 303, 304 thereof are driven to the left in the similar manner as in the first forward mode as long as the command is present on line P14. In the third forward mode, port c of 2-1 down shift valve 160 communicates with drain g of 2-3 directional control valve 190 through line P16, and the hydraulic pressure of line P15 is applied to ports b and c of 3-2 down shift valve 180. The port c of 1-2 up shift valve 150 communicates with line P14. In the third forward mode, when the pistons 303, 304 have moved to their leftmost position in response to the speed increase command and the latter continues to be present, there occurs a sharp rise in the pressure of line P14, and a hydraulic pressure which is equal to that of line P2 is applied to port c of 2-3 up shift valve 170 and to port c of 1-2 up shift valve 150. However, there is no change in the position of the valves 150 and 170 since they assume the switched positions.

A shift down from the second forward to the first forward mode or a corresponding switching of clutches will now be described. In the second forward mode, the pistons 303, 304 of the actuator 300 are driven to the left to achieve a reduced speed ratio. When a hydraulic pressure indicative of a speed ratio decrease command is present in line P15 when pistons 303, 304 have reached their leftmost positions, a pressure rise occurs in lines P19, P20 and P15, whereby the hydraulic pressure of line P16 which communicates with line P20 increases. A corresponding increase occurs in the hydraulic pressure applied to port c of 2-1 down shift valve, and is combined with the resilience of spring 162 to return piston 163 downward. Therefore, port e is disconnected from drain d and communicates with port f, allowing a pressure rise in line P6 to achieve the engagement of brake B. The hydraulic pressure of line P6 is applied to port a, whereby pistons 161, 163 of valve 160 are maintained in their lower positions. Hydraulic pressure of brake B or that of line P6 is applied to delay valve 35 of 1-2 up shift valve 150 and is passed through the orifice thereof to cause a pressure rise at port g after a given time delay, allowing piston 153 to move upward. This establishes a communication of line P5 with drain d of valve 150, disengaging clutch CL3. The reduced pressure of line P5 and a corresponding pressure rise of line P6 return the piston 201 of 1-2 directional control valve 200 to the right, in a manner opposite from the switching from the first forward to the second forward mode. Thus, line P19 communicates with lines P21-P14, and line P18 communicates with lines P20-P15. This establishes the first forward mode.

When shifting down from the third forward to the second forward mode, 3-2 down shift valve 180 operates in the similar manner as described previously in connection with 2-1 down shift valve 160, and 2-3 up shift valve 170 operates in the similar manner as mentioned previously in connection with 1-2 up shift valve 150. In this instance, piston 191 of 2-3 diverting valve 190 is returned from its left-hand position to its right-hand position. During this shift down, the clutch which had been engaged before the shift down is maintained while a clutch which is to be engaged after the shift down is engaged, followed by the disengagement of the previously engaged clutch. Such an overlapping clutch actuation occurs during a preselected time interval. The relationship between the speed ratio ranges and the engagement or disengagement of clutches and brake B is shown in a table of FIG. 11 where circles represent the engaged condition.

When any clutch or clutches and/or brake is to be engaged or disengaged in order to change the speed ratio range, those clutches and/or brake which should be in engagement during either an earlier or a later speed ratio range are maintained engaged in overlapping manner during a certain time interval, so that there is no no-load condition on the engine during the time the speed range is to be changed, avoiding an increase in the engine speed or shocks on the shafts which might otherwise occur when a clutch or clutches are to be engaged. Since the speed ratio range is automatically changed in response to the hydraulic pressure of line P18 and P19 which are applied to the actuator 300, there is no need for a special provision of electrical instrument which detect the synchronized switching of clutches or the timing at which the speed ratio range is changed. Since the direction of movement of the actuator 300 is switched after the completion of switching the clutches, there is achieved a stable and safe control in changing the speed ratio range.

The operation of high pressure relief valves 90 and 100 will now be described. Since both valves 90, 100 are similar in construction, the operation of only one valve, 90, will be described. The piston 96 of high pressure relief valve 90 is energized for operation in response to a hydraulic pressure which is supplied from the selective locking valve 140 through line P13. As mentioned previously with the locking operation of the manual select valve 130, the hydraulic pressure of line P13 is low as a result of its communication with drain d of the selective locking valve 140 only in the neutral position N and upon starting of the reverse mode and the first forward mode. At other times (namely, during running), it assumes a value which is equal to the constant pressure of line P2. Consequently, during the time the vehicle is running, piston 96 of pilot valve 94 is strongly urged upward with an assistance of the spring 95, and when the pressure of port 97 or that of line P1 sharply rises to a first preselected pressure, hydraulic pressure which is introduced into chamber 91b from line P1 through orifice 91a drives the pilot valve 94 downward. This in turn opens the passage 93, allowing the hydraulic oil of the chamber 91b to be discharged to line P0 to reduce the pressure within the chamber 91b. A pressure differential is then produced between line P1 and the interior pressure of chamber 91b, and acts against the resilience of the spring 92 to move piston 91 down, providing a communication between port 97 and line P1 and port 98 and line P0.

As the pressure within chamber 91b further reduces as a result of the passage 93 which is opened and a reduction in the pressure of line P1, the hydraulic pressure which has driven pilot valve 94 downward against the resilience of spring 95 to maintain the passage 93 open is reduced, and is overcome by the resilience of spring 95 to permit pilot valve 94 to close passage 93. Thereupon, the pressure of line P1 becomes equal to the internal pressure of chamber 91b, so that piston 91 is urged upward by spring 92 to interrupt the communication between port 97 and line P1 and port 98 and line P0. It will be appreciated from the foregoing description that the pressure of line P1 is determined in accordance with the resilience of spring used in pilot valve 94. By contrast, in the neutral position N and upon starting of the reverse mode and first forward mode, the low pressure of line P13 maintains piston 96 in its lowermost position, with consequence that the upward drive upon the pilot valve 94 is reduced. Hence, when the pressure of line P1 rises to a relatively low, preselected value, the hydraulic oil which is located inside of piston 91 is discharged through passage 93 to line P0, resulting in a reduced pressure within chamber 91b. Consequently, piston 91 moves down to provide a communication between ports 97 and 98. In this manner, the high pressure relief valve 90 operates as a bypass valve except when the vehicle is running. The operation of high pressure relief valves 90 and 100 maintains a low discharge pressure of pump motors M1, M2 as during the idling when the engine is started, thus reducing the load on the engine. During the time when the vehicle is running, the high pressure relief operation prevents an excessive pressure rise of pump motors M1, M2 as well as a consequent excessive temperature rise of the hydraulic oil.

Since relief valves 90 and 100 each provide the function of both a high pressure relief valve and a bypass valve with a single valve, the available space can be efficiently utilized and the required cost reduced. The adjustment of the resilience applied to pilot valve 94 by way of the hydraulic pressure of line P13 buffers or alleviates the pressure impact upon the pilot valve 94. In this manner, the durability of pilot valve 94 and passage 93 is improved.

The operation of the speed ratio control pilot valve 230 and the speed ratio control valve 220 will be described. As the accelerator pedal 10 is depressed, a corresponding movement of cam 22 is transmitted, as a cam lift representing a throttle opening which corresponds to a target engine speed, to the piston 231 of the speed ratio control pilot valve 230. The cam lift is transmitted in the form of a compression of the spring 232 of pilot valve 230. And a force corresponding to the magnitude of the cam lift is applied through spring 232 to piston 233 to urge it to the right. This force is resisted by the governor pressure corresponding to the actual engine speed which is supplied from engine governor G1 through lines P12 and P11 and port g and which urges the piston 233 to the left. The piston 233 shifts in accordance with the difference therebetween to produce a hydraulic pressure on line P26 which coresponds to a difference between the magnetude of the cam lift (a target engine speed) and the actual engine speed. This hydraulic pressure is supplied to port h of the speed ratio control valve 220 through orifice 223 and accumulator 260 which applies a primary time delay. The hydraulic pressure from line P26 urges piston 221 to the left while the hydraulic pressure which represents the derivative of the throttle opening is supplied through line P24 to urge the piston to the right together with assistance by the resilience of spring 222. The piston 221 shifts in accordance with the relative magnitude of these forces applied thereto. Speed ratio control valve 220 is set up such that when line P24 produces no derivative pressure, it assumes a neutral position in which line P25 communicates with neither line P24 nor P15 when the target and the actual engine speed is equal to each other in the pilot valve 230. When the actual engine speed exceeds the target speed, piston 233 moves to the left from its neutral position, whereby the hydraulic pressure of line P26 will be reduced than the value which it assumes in the neutral position. Consequently, piston 221 moves to the right from its neutral position, providing a communication between ports e and d and between port f and drain g. Thus, line P14 communicates with line P25, and line P15 communicates with drain g. The degree of communication achieved is determined by the hydraulic pressure of line P26 (or more strictly by the pressure which prevails at port h of control valve 220). Lines P14 and P15 communicate with lines P18, P19 through the directional control valves 190 and 200, depending upon the operative positions of the latter. In this manner, a hydraulic flow is applied to the actuator 300 which causes the speed ratio to increase in accordance with the degree of communication provided between lines P14 and P25 and between line P15 and drain g.

When the actual engine speed is below the target speed, the hydraulic pressure of line P16 will be greater than the value which it assumes in the neutral position, whereby piston 221 will be driven to the left. Consequently, a communication is provided between ports e and f and between port d and drain c. Thus, line P14 communicates with drain c while line P15 communicates with line P25. The degree of communication is again determined by the pressure of line P26. In this manner, a hydraulic flow is applied to the actuator 300 which causes the speed ratio to decrease. A hydraulic pressure representing the derivative of the throttle opening is produced by differential control valve 240 to provide a compensation for the starting, and is supplied through line P24 to port b of speed ratio control valve 220, urging in the piston 221 to the right. Thus, this hydraulic pressure signal acts to increase the degree of communication between lines P25 and P14, increasing the hydraulic flow supplied to the actuator 300 in a direction to increase the speed ratio. Since the hydraulic pressure of line P24 is supplied to port b of pilot valve 230 to urge the piston 233 to the left, the effect of this compensation is reflected in the hydraulic pressure of line P26. The amplification by the pilot valve 230 provides a compensation effect which exceeds the compensating pressure supplied to port b of the speed ratio control valve 220.

The drivation of the hydraulic flow which drives the actuator from the combination of the speed ratio control pilot valve 230 and the speed ratio control valve 220, namely, the pilot valve 230 which amplifies a difference between the actual and the target engine speed before it is supplied to the control valve 220 which in turn provides a further amplification to supply a hydraulic flow to the actuator in order to control the speed ratio, assures the supply of a sufficient flow to drive the swash plate of pump motor M2 and facilitates the set-up of the speed ratio control mechanism if the magnitude of the cam lift of cam 22 or that of the output pressure of governor G1 is low. Also, the supply of the speed ratio controlling, compensating pressure in the form of the drivative of the throttle opening or a hydraulic pressure representing the rotating speed of the output shaft to the speed ratio controlling lines is facilitated. Since the cam 22 can be designed to provide a small lift, the power which is required to depress the accelerator pedal 10 may be chosen to be small. While the mechanical-hydraulic stepless, variable speed transmission has been described in the above embodiment, it should be understood that the invention is equally applicable to stepless variable speed transmissions of any other types.

What is claimed is:

1. A control system for a stepless variable speed transmission including a drive train between an input shaft and an output shaft and having at least two speed ratio ranges which are selectively completed by a switching operation of the power transmission control means such as clutch or brake and wherein a speed ratio in each range is controlled by controlling the supply of a hydraulic fluid to a speed ratio controlling actuator; the control system comprising an up shift valve means to which a speed ratio increasing hydraulic pressure applied to the actuator and a hydraulic pressure of the power transmission control means in the low speed ratio range are applied in opposing relationship and which switches a hydraulic pressure of the power transmission control means in the high speed ratio range when the speed ratio increasing hydraulic pressure exceeds a given value, a down shift valve means to which a speed ratio decreasing hydraulic pressure applied to the actuator and a hydraulic pressure of the power transmission control means in the high speed ratio range are applied in opposing relationship and which switches a hydraulic pressure of the power transmission control means in the low speed ratio range when the speed ratio decreasing hydraulic pressure exceeds a given value, and a directional control valve means to which the hydraulic pressure of the power transmission control means in the low speed ratio range and the hydraulic pressure of the power transmission control means in the high speed ratio range are applied in opposing relationship to drive the control valve means in accordance with a pressure difference therebetween to thereby reverse the direction in which the speed ratio increasing and the speed ratio decreasing hydraulic pressure is applied to the actuator.

2. A control system according to claim 1 in which the up shift valve means is supplied with a hydraulic pressure of the power transmission control means in the low speed ratio range from the down shift valve means through an orifice to be driven in its returning direction after a given time interval, thereby the hydraulic pressure of the power transmission control means in the high speed ratio range, and wherein the down shift valve means is supplied with a hydraulic pressure of the power transmission control means in the high speed ratio range from the up shift valve means through an orifice to be driven in a returning direction after a given time interval to restore the hydraulic pressure of the power transmission control means in the low speed ratio range, the speed ratio increasing and the speed ratio decreasing hydraulic pressures being applied to the directional control valve means through orifices.

3. A control system for a stepless variable speed transmission including a drive chain connected between an input shaft and output shaft and having at least two speed ratio ranges which are selectively completed by a switching operation of power transmission control means such as clutch or brake, and also including hydraulic pump motor which controls the speed ratio and wherein a speed ratio in each range is controlled by controlling the supply of a hydraulic fluid to a speed ratio controlling actuator; the control system comprising an up shift valve means to which a speed ratio increasing hydraulic pressure applied to the actuator and a hydraulic pressure of power transmission control means in the low speed ratio range are applied in opposing relationship and which switches a hydraulic pressure of power transmission control means in the high speed ratio range when the speed ratio increasing hydraulic pressure exceeds a given value; a down shift valve means to which a speed ratio decreasing hydraulic pressure applied to the actuator and a hydraulic pressure of power transmission control means in the high speed ratio range are applied in opposing relationship and which switches a hydraulic pressure of power transmission control means in the low speed ratio range when the speed ratio decreasing hydraulic pressure exceeds a given value; a directional control valve means to which a hydraulic pressure of the power transmission control means in the low speed ratio range and a hydraulic pressure of power transmission control means in the high speed ratio range are applied in opposing relationship to drive the control valve means in accordance with a pressure difference therebetween for reversing the direction in which the speed ratio increasing and the speed ratio decreasing hydraulic pressure is applied to the actuator; a manual select valve means which establishes a forward, a neutral or a reverse mode; a selective locking means which receives a signal indicating one of the forward, neutral or reverse mode as well as a signal indicative of the speed ratio of the stepless variable speed transmission and responding to a combination of the signals for preventing the mode established in the manual select valve means from being changed during the running of a vehicle; means for producing a speed ratio controlling signal which is supplied to the actuator through the directional control valve means and including a target value generating means which produces a target engine speed signal corresponding to a throttle opening of an engine, means for producing a signal indicative of a actual engine speed, a first pressure regulating valve means which compares the signals and produces a hydraulic pressure which corresponds to a difference between the target and the actual engine speed, and speed ratio control valve means including a valve body which is driven by the hydraulic pressure from the first pressure regulating valve means and responding to the hydraulic pressure by supplying a speed ratio increasing or decreasing hydraulic pressure; and a second pressure regulating valve means connected with the input and output hydraulic lines of the hydraulic pump motor for controlling the hydraulic pressures prevailing at these lines.

4. A control system according to claim 3 in which said means for producing a target value comprises a cam mounted for angular movement in interlocked relationship with an engine throttle, a follower member disposed in abutment against the cam for translational movement in one direction, and a spring member which urges the follower member toward the cam, and wherein the pressure regulating valve means comprises a hydraulic pressure control valve including a valve body which is disposed to be urged by the spring member on the opposite side from the follower member, a first hydraulic pressure input port for applying a hydraulic pressure to the valve body in opposition to the resilience of the spring, the hydraulic pressure being indicative of an engine rotation signal, a second hydraulic pressure input port receiving a speed ratio controlling hydraulic pressure, a low pressure port, and hydraulic pressure output port disposed for communication with either one of the second input port and the low pressure port in accordance with the position of the valve body, and wherein the speed ratio control valve means comprises a flow rate control valve including an axially displaceable valve spool, a spring member urging the valve body in one direction, a first hydraulic pressure input port receiving the output pressure from the first pressure regulating valve means and hydraulically urging the valve body in the opposite direction, a second hydraulic pressure input port receiving a speed ratio controlling hydraulic pressure, a low pressure port, and a pair of output ports which can be brought into communication with the second input port and the low pressure port respectively, in accordance with the position of the valve body.

5. A control system according to claim 3 in which the selective locking means comprises a valve which receives the hydraulic pressure of power transmission control means of the stepless variable speed transmission and the speed ratio controlling hydraulic pressure applied to the actuator for releasing a locking hydraulic pressure when the speed ratio is substantially zero and the power transmission control means of the stepless variable speed transmission has chosen a selected mode and for otherwise producing a locking hydraulic pressure which is supplied to the locking means associated with the manual select valve means.

6. A control system according to claim 5 in which the second pressure regulating valve means which is connected with the input and output hydraulic lines of the hydraulic pump motor to control the prevailing hydraulic pressures thereat comprises a pressure regulating valve including a first chamber connected with one of the input and output hydraulic lines which connect a first hydraulic pump motor of the fixed discharge with a second hydraulic pump motor having a variable discharge, a second chamber communicating with the first chamber through a passage, a first piston disposed within the first chamber and urged by a first spring in a direction to isolate said one hydraulic line from the first chamber, a port communicating with the other of the input and output hydraulic lines and communicating with said one hydraulic line through the first chamber when the first piston is depressed in response to the hydraulic pressure of said one hydraulic line, a pilot valve disposed within the second chamber and urged by a second spring in a direction to close the passage, a second piston disposed within the second chamber and urged by the second spring in the opposite direction from the pilot valve, another port communicating with said other hydraulic line and the second chamber, and a control port communicating with the second chamber and applying a locking hydraulic pressure of the selective locking means to the second piston in a direction to compress the second spring.

* * * * *